United States Patent
Clarke et al.

(10) Patent No.: US 8,439,487 B2
(45) Date of Patent: *May 14, 2013

(54) CONTINUOUS INK JET PRINTING OF ENCAPSULATED DROPLETS

(75) Inventors: Andrew Clarke, Haslingfield (GB); John M. Higgins, Pinner (GB); Andrew M. Howe, Cambridge (GB); Danuta Gibson, Cambridge (GB); Stephanie V. Desrousseaux, Cidex (FR)

(73) Assignee: Eastman Kodak Company, Rochester, NY (US)

( * ) Notice: Subject to any disclaimer, the term of this patent is extended or adjusted under 35 U.S.C. 154(b) by 387 days.

This patent is subject to a terminal disclaimer.

(21) Appl. No.: 12/664,938

(22) PCT Filed: Jun. 27, 2008

(86) PCT No.: PCT/GB2008/002231
§ 371 (c)(1),
(2), (4) Date: Apr. 30, 2010

(87) PCT Pub. No.: WO2009/004318
PCT Pub. Date: Jan. 8, 2009

(65) Prior Publication Data
US 2010/0238232 A1    Sep. 23, 2010

(30) Foreign Application Priority Data
Jul. 3, 2007 (GB) .................. 0712861.4

(51) Int. Cl.
*B41J 2/02* (2006.01)
*B41J 2/07* (2006.01)

(52) U.S. Cl.
USPC ............................. 347/73; 347/74

(58) Field of Classification Search .............. 347/73; 425/5
See application file for complete search history.

(56) References Cited

U.S. PATENT DOCUMENTS

| 4,196,437 A * | 4/1980 | Hertz .............. 347/74 |
| 4,614,953 A | 9/1986 | Lapeyre |
| 5,113,198 A | 5/1992 | Nishikawa et al. |
| 6,377,387 B1 | 4/2002 | Duthaler et al. |
| 6,520,629 B1 * | 2/2003 | Sharma et al. .......... 347/77 |
| 6,554,410 B2 | 4/2003 | Jeanmaire |
| 6,713,389 B2 | 3/2004 | Speakman |

(Continued)

FOREIGN PATENT DOCUMENTS

| EP | 1 193 066 | 4/2002 |
| EP | 1 364 718 | 10/2007 |

(Continued)

OTHER PUBLICATIONS

T. E. Faber, Fluid Dynamics for Physicists, CUP 1995, p. 295.

(Continued)

*Primary Examiner* — Shelby Fidler
(74) *Attorney, Agent, or Firm* — William R. Zimmerli

(57) ABSTRACT

A method for creating composite droplets for use in an ink jet system includes a first fluid (1) brought into contact with a second fluid within a set of channels (5,14). The interface between the fluids is characterized by an interfacial tension. The first fluid forms spaced droplets (8) within the second fluid, the composite of the first and second fluids passing through an orifice (6) to form a jet (9).

14 Claims, 16 Drawing Sheets

U.S. PATENT DOCUMENTS

| | | | |
|---|---|---|---|
| 2001/0015735 A1 | 8/2001 | Matsumoto | |
| 2002/0051029 A1 | 5/2002 | Yamamoto | |
| 2005/0172476 A1 | 8/2005 | Stone et al. | |
| 2006/0051329 A1* | 3/2006 | Lee et al. | 424/93.7 |
| 2006/0163385 A1 | 7/2006 | Link et al. | |
| 2006/0234051 A1 | 10/2006 | Zhang et al. | |
| 2007/0003442 A1 | 1/2007 | Link et al. | |
| 2007/0054119 A1 | 3/2007 | Garstecki et al. | |

FOREIGN PATENT DOCUMENTS

| | | |
|---|---|---|
| JP | 1996207318 | 8/1996 |
| WO | WO 98/53946 | 12/1998 |
| WO | WO 02/23163 | 3/2002 |
| WO | WO 2004/091763 | 10/2004 |
| WO | WO 2005/103106 | 11/2005 |
| WO | WO 2006/038979 | 4/2006 |
| WO | WO 2006/096571 | 9/2006 |

OTHER PUBLICATIONS

P. G. deGennes et al., "Capillarity and Wetting Phenomena", Springer 2004, p. 118.

Anna et al., Appl. Phys. Lett 82, 3 (2003) 364.

* cited by examiner

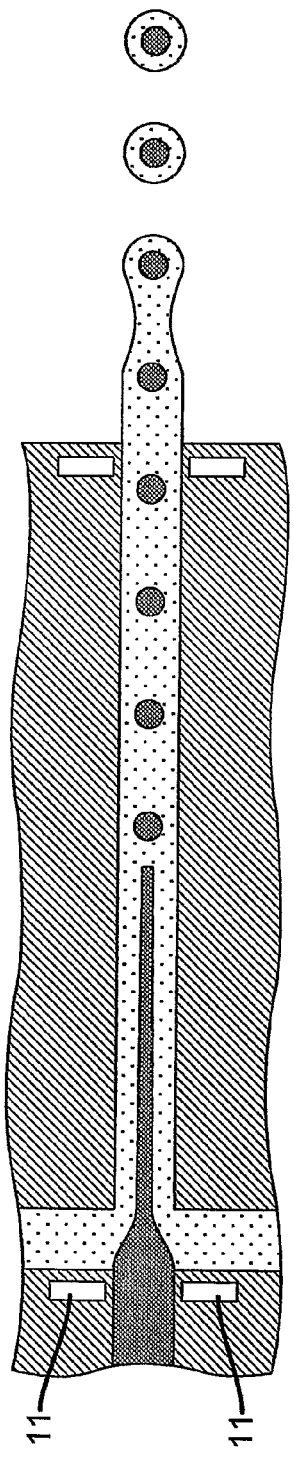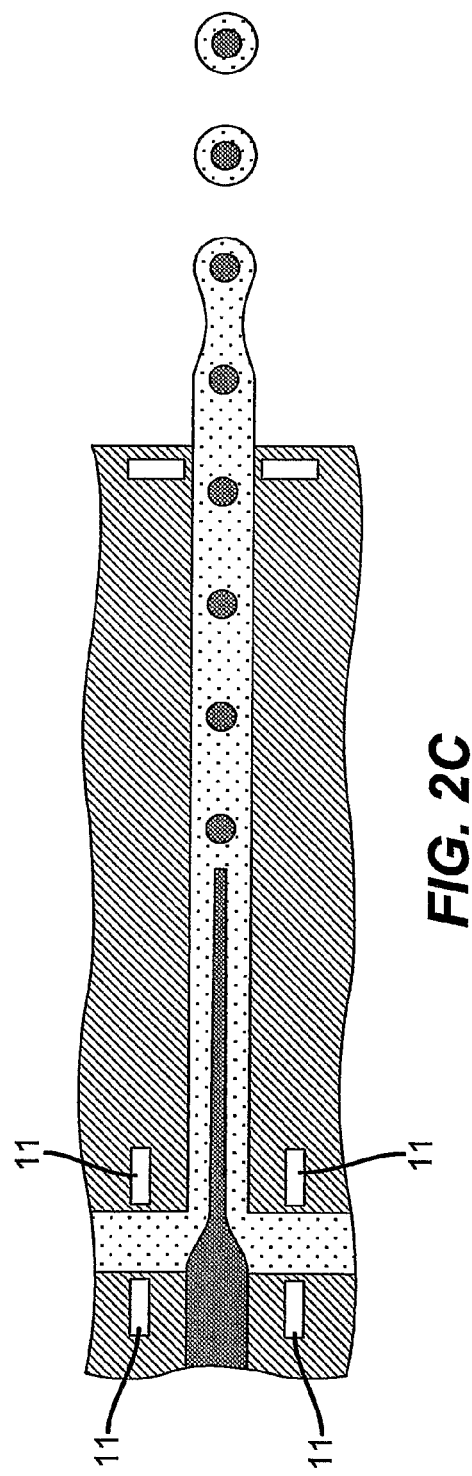

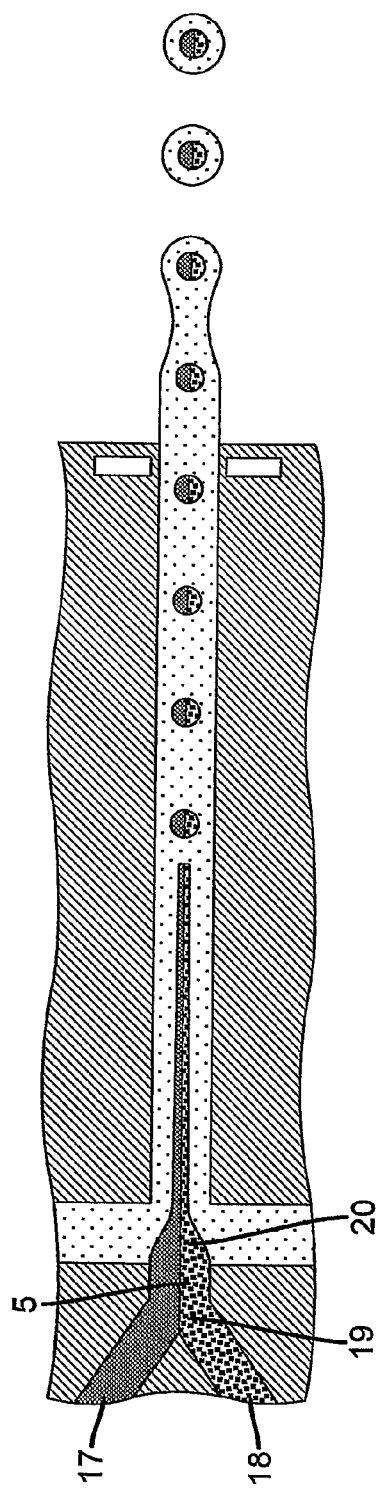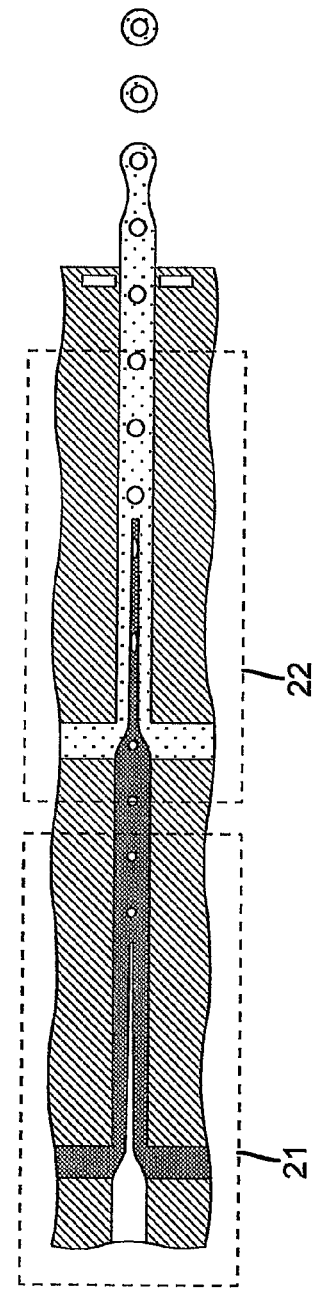
FIG. 3A
FIG. 3B

CONTINUOUS INK JET PRINTING OF ENCAPSULATED DROPLETS

FIELD OF THE INVENTION

This invention relates to the field of continuous ink jet printing, in particular to the formation of composite droplets using a microfluidic device.

BACKGROUND OF THE INVENTION

With the growth in the consumer printer market, inkjet printing has become a broadly applicable technology for supplying small quantities of liquid to a surface in an image-wise way. Both drop-on-demand (DOD) and continuous inkjet (CIJ) devices have been conceived and built. Whilst the primary development of inkjet printing has been for aqueous based systems with some applications of solvent based systems, the underlying technology is being applied much more broadly.

Inkjet printing continues to strive for higher spatial resolution. Because the colorant is uniformly distributed within the ink at a constant concentration in all current systems (DOD and CIJ), this resolution is determined by the droplet size. Thus in order to push to higher resolution, it will be necessary to generate smaller drops at higher frequency. In producing ever-smaller drops, several technical constraints become progressively more severe.

First, ever higher droplet velocity is required to maintain droplet inertia and therefore throw distance and placement accuracy. Second, to produce smaller drops smaller orifices are required. This then demands finer filtration since the nozzles will block more easily. Third, the smaller nozzle diameter will require higher back pressure to ensure the same jet Weber number.

The break-up of a thin liquid jet driven by capillary forces is well known. The instability is driven by capillary forces that reduce the surface area of the jet by forming droplets, and is known as the Rayleigh-Plateau instability (J. Plateau 1873; see e.g. T. E. Faber, "Fluid dynamics for physicists", CUP 1995, p 295 or P. G. de Gennes, F. Brochard-Wyart, D. Quéré, "Capillarity and Wetting Phenomena", Springer 2004, p 118.). The process is seen in nature in the dew that forms on a spider's web, where the uniform film on each thread eventually beads up to form separated droplets. It is also routinely seen in the dripping of a household tap. In recent years this instability has been widely studied in the context of inkjet printing. For drop-on-demand (DOD) printing, there is usually a thread of liquid that follows drop ejection and which subsequently disintegrates to form unwanted satellites. For continuous inkjet (CIJ), the continuous formation of droplets from the jet in a controlled fashion is fundamental to the robust operation of the process. It is well understood that the growth of random perturbations to the jet (radius, pressure, velocity, surface tension etc.) lead to the formation of drops at an average frequency corresponding to approximately 9 times the jet radius, the so called Rayleigh frequency. It is also well known that by periodically perturbing the jet the drop formation can be stabilised at frequencies between approximately 0.25×Rayleigh frequency and 1.25×Rayleigh frequency. At frequencies above approximately 1.39×Rayleigh frequency, the jet is in fact stable. Although most attention has been paid to liquid jets in air, exactly the same process takes place for an immiscible jet in another liquid, where it is now the interfacial tension that is the driving force. Again the Rayleigh frequency is observed, though the final break-up process is slightly different in detail.

A new continuous inkjet device based on a MEMs formed set of nozzles has been recently developed (see U.S. Pat. No. 6,554,410). In this device a liquid ink jet is formed from a pressurized nozzle. One or more heaters are associated with each nozzle to provide a thermal perturbation to the jet. This perturbation is sufficient to initiate break-up of the jet into regular droplets through the Rayleigh-Plateau instability. By changing the timing of electrical pulses applied to the heater large or small drops can be formed and subsequently separated into printing and non-printing drops via a gaseous cross flow. All continuous inkjet processes require capture and recirculation of non-printing droplets. These processes are problematic for liquids containing many useful additives such as polymeric materials and colloidal materials such as pigments. Furthermore, because of the need to sort printing droplets from non-printing droplets, contone printing is not in general possible, i.e. all printing droplets being the same size and the same colorant density. By enabling contone printing the requirement for high spatial resolution is significantly reduced since with a binary printing arrangement spatial resolution is used to create the illusion of colour variation.

In the last several years the field of microfluidics has grown significantly. Inkjet drop generation devices are microfluidic devices in that they employ very small scale liquid channels. The implication of this is that the Reynolds number $$Re = \frac{\rho U L}{\mu}$$

where $\rho$ is the liquid density (kg/m$^3$), U is a characteristic velocity (m/s), L a characteristic length (m) and $\mu$ the liquid viscosity (pa·s), is sufficiently small that inertial effects are sufficiently small that the flow is predominantly laminar in nature. For a typical continuous inkjet system the velocity might be 20 m/s and a length might be 5 µm with a density approximately 1000 kg/m$^3$ and a viscosity of 1 mPas, the Reynolds number is therefore approximately 100. The transition to turbulent flow in a straight pipe occurs at Re above approx 2000.

Microfluidic devices where the liquid flow is laminar necessarily prevent mixing. In fact the only mechanism available for mixing is diffusional flow. For example, consider a T junction in which two fluids are injected to flow alongside each other. How far down the channel must the fluids flow before the channel is homogenized? A simple estimate requires the particles or molecules to diffuse across the entire channel, giving a time $t_D \sim w^2/D$, where w is the width of the channel and D is the diffusion constant. During this time, the material will have moved a distance $Z \sim U_0 w^2/D$ down the channel, so that the number of channel widths required for complete mixing would be of order $$\frac{Z}{w} \approx \frac{U_0 w}{D} \equiv Pe$$

The dimensionless number on the right is known as the Péclet number (Pe), which expresses the relative importance of convection to diffusion. In this example, the number of channel widths required for full mixing varies linearly with Pe. Using the diffusivities in the table below, estimated using the Stokes-Einstein relation, we see that even a dye molecule flowing with the fluid through a 10 µm channel at 1 m/s requires Pe ~250000 channel widths to completely mix.

Alternatively, that same dye molecule flowing with the fluid at 1 m/s would require a pipe length z~25 mm to diffuse 1 μm.

| Characteristic Diffusivities in water at room temperature | | |
|---|---|---|
| Particle | Typical size | Diffusion constant |
| Solute ion | $10^{-1}$ nm | $2 \times 10^3$ μm²/s |
| Dye molecule | 5 nm | 40 μm²/s |
| Colloidal particle | 100 nm | 2 μm²/s |
| Bacterium | 1 μm | 0.2 μm²/s |
| Mammalian/human cell | 10 μm | 0.02 μm²/s |

A class of microfluidic device that has recently proved extremely interesting are flow focussing devices (FFD see e.g. Anna et al Appl Phys Lett 82, 3 (2003) 364; US 2005/0172476). In an FFD a liquid flows into a middle channel and a second immiscible liquid flows into one or more outside channels. The two liquid phases are then forced to flow through a small orifice that is located downstream of the channels. The outer fluid exerts pressure and viscous stresses that force the inner fluid into a narrow thread, which then breaks inside or downstream of the orifice. These devices are of interest because by operating in either a geometry controlled or dripping mode, monodisperse droplets are formed that have many uses, e.g. emulsion formation, drug encapsulation, particle engineering etc. However, monodisperse drops are not formed in the jetting regime, i.e. where the central immiscible liquid breaks up via capillary forces in the Rayleigh regime.

An alternative droplet formation device brings two immiscible liquids together at a T junction (WO 2002/23163). In this device the shear of the outer fluid on the interface of the inner liquid creates the droplets in a dripping mode. The size of the droplet so formed is controlled by the ratio of the shear stress acting on the liquid-liquid interface and the interfacial tension.

Using these devices various operations on droplets can be performed (see US 2005/0172476, US 2006/0163385, US 2006/0234051, US 2007/0054119, WO 2004/091763). In general the purpose is to engineer droplets or particles or to encapsulate, for example, drugs. Coalescence of droplet streams is achieved (US2007/0003442), mixing and polymerisation of droplets (WO2005/103106), and multiple emulsions are formed (WO2006/096571).

EP 1364718 discloses a method of generating encapsulated droplets via co flowing immiscible liquids. In this method the liquids are supplied by coaxially arranged nozzles, which are difficult to manufacture as an array. Further, this method relies on a strong electrostatic field to ensure break-up of the coaxially arranged liquids.

JP 1996207318 also uses coaxial tubes and electrostatics to break off a droplet. The centre tube in this case can supply colloidal particles or a plurality of them to provide a colour level. Electrophoretic means can stop the flow of particles by arrangement of electric fields.

WO 2006/038979 describes a concentric piezoelectric system to enable encapsulated drop on demand printing.

U.S. Pat. No. 6,713,389 describes placing multiple discrete components on a surface for the purpose of creating electronics.

U.S. Pat. No. 5,113,198 describes using a carrier gas stream to direct vaporous dyes toward a surface. It discloses use of co flowing gas streams, but not liquids.

U.S. Pat. No. 6,377,387 describes various methods for generating encapsulated dispersions of particles.

WO 2002/23163 describes cross-flow devices for making emulsion droplets for biological applications.

PROBLEM TO BE SOLVED BY THE INVENTION

The invention aims to provide a method of producing composite droplets for use in a printing process that overcomes the technical difficulties mentioned above.

SUMMARY OF THE INVENTION

According to the present invention there is provided a method for creating composite droplets for use in an ink jet system whereby a first fluid is brought into contact with a second fluid within a set of channels, the interface between the fluids being characterised by an interfacial tension, the first fluid forming spaced droplets within the second fluid, the composite of the first and second fluids passing through an orifice to form a jet, the composite jet being perturbed to initiate break-up such that the droplets of the first fluid are encapsulated within droplets of the second fluid.

The invention further provides a microfluidic device for use in a continuous ink jet printer comprising at least one first channel for feeding a first fluid and at least one second channel for feeding a second fluid, the channels intersecting such that shear forces allow a jet of the first fluid to form within the second fluid and to subsequently disintegrate to form spaced droplets of the first fluid within the second fluid, and a subsequent nozzle to form a composite jet.

ADVANTAGEOUS EFFECT OF THE INVENTION

The method of the present invention removes the need for the complex processes of ink catching and recirculation. Without recirculation the method is fast and significantly simpler. It is also therefore less costly.

By using a microfluidic system to provide colorant as separate droplets on demand or continuously into a carrier liquid the composite of which can be continuously jetted, the advantage of high speed realized with continuous inkjet can be combined with the liquid handling advantages of DOD systems. Further the method allows the possibility of continuous tone printing in a CIJ format by varying either the size or the density of the colorant droplet without affecting the outer drop.

By so focussing the colorant, the printed resolution is improved since the spatial resolution is dependant on the colorant placement, not the liquid placement.

Further, by placing one or more of the ink components within the central droplet, there is a separation of the liquid requirements for jetting and those for drop formation, from the material properties for the ink. That is, the outer liquid can be optimised for jetting whilst the inner liquid can be optimised for image or printed pattern formation.

Interactions of ink components with the nozzle lead to nozzle wear, drop break-up fluctuations and thermal degradation of the ink. By placing one or more of the ink components into immiscible drops within the flow, they are kept separate from the nozzle and therefore cannot interact with it.

By being able to control the proportion of colorant added to the carrier flow it is possible to reduce the proportion to zero. This also allows "empty" drops so printing can be continuous with colorant only where necessary.

Multiple components can be jetted within the same droplet. The method allows the possibility of jetting difficult components such as reactive species, high viscosity species etc. It also allows the possibility of printing onto difficult, impermeable, low energy surfaces such as polypropylene, polyethylene, etc.

By providing air or gas as the inner fluid the total amount of liquid being printed can be reduced. Therefore drying of the final print is eased.

The method of the invention enables multiple colorants within a single drop.

BRIEF DESCRIPTION OF THE DRAWINGS

The invention will now be described with reference to the accompanying drawings in which:

FIGS. 2a, 2b and 2c schematically illustrate a continuous inkjet droplet generator configuration with encapsulated droplets;

FIGS. 3a and 3b schematically illustrate methods of providing a composite fluid for encapsulated inkjet droplets;

DETAILED DESCRIPTION OF THE INVENTION

Figure 1A:
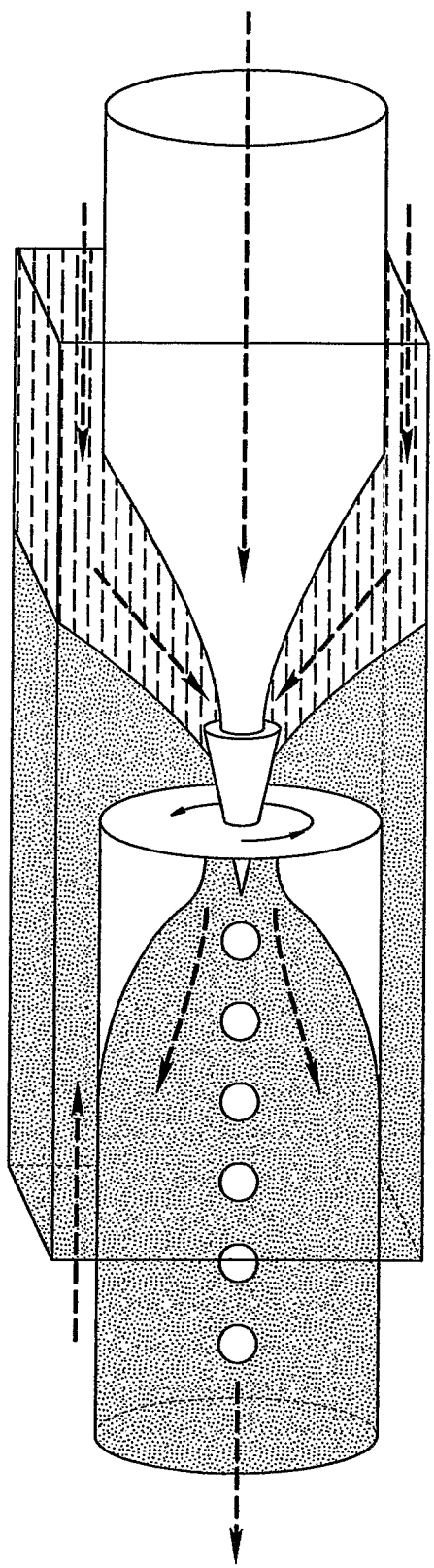
FIGS. 1a, 1b and 1c illustrate prior art of various devices (WO2006/096571, US2007/0054119 and WO2002/0231163 respectively) for forming droplets of one immiscible liquid within another.
Figure 1B:
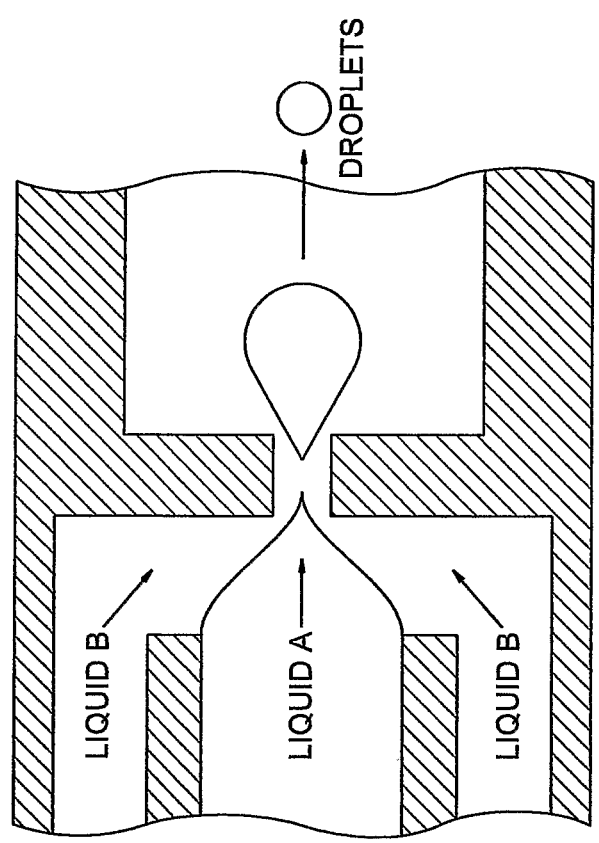
Figure 1C:
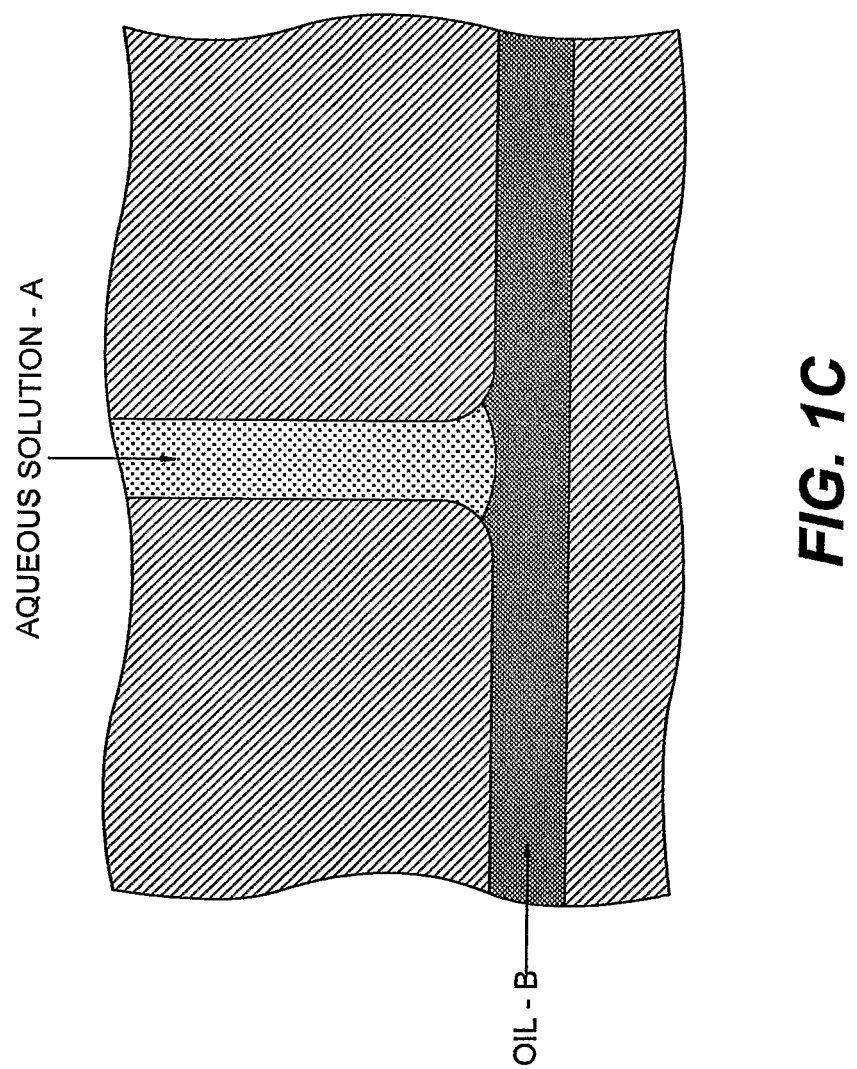

FIG. 1 shows the prior art available for creating drops of one immiscible liquid within another. FIGS. 1a and 1b show two variations of a flow focusing device and FIG. 1c shows a shear flow T piece. In all cases these devices are used for generating droplets in a flow regime where the outer and inner liquid flow is sufficiently slow that the inner liquid does not form a jet, since under these conditions monodisperse droplets are produced. In the present invention, we provide an orifice in order to form a free jet, i.e a liquid jet in air. For this purpose the liquid velocity, $U_{jet}$, must be greater than $$U_{jet} \geq \sqrt{\frac{\sigma}{R\rho}}$$

where σ is the surface tension of the outer liquid (N/m), R is the radius of the jet (m) and ρ is the average density of the composite jet (kg/m³). For typical values this might be approximately 4 m/s. Furthermore, since we require inner droplets of a similar size to the final jet, then the internal device that forms the internal droplets will have channels of a similar size to the orifice, and therefore the velocity will be similar to that of the final jet, and therefore the internal device must necessarily be operated in the jetting regime.

Figure 2A:
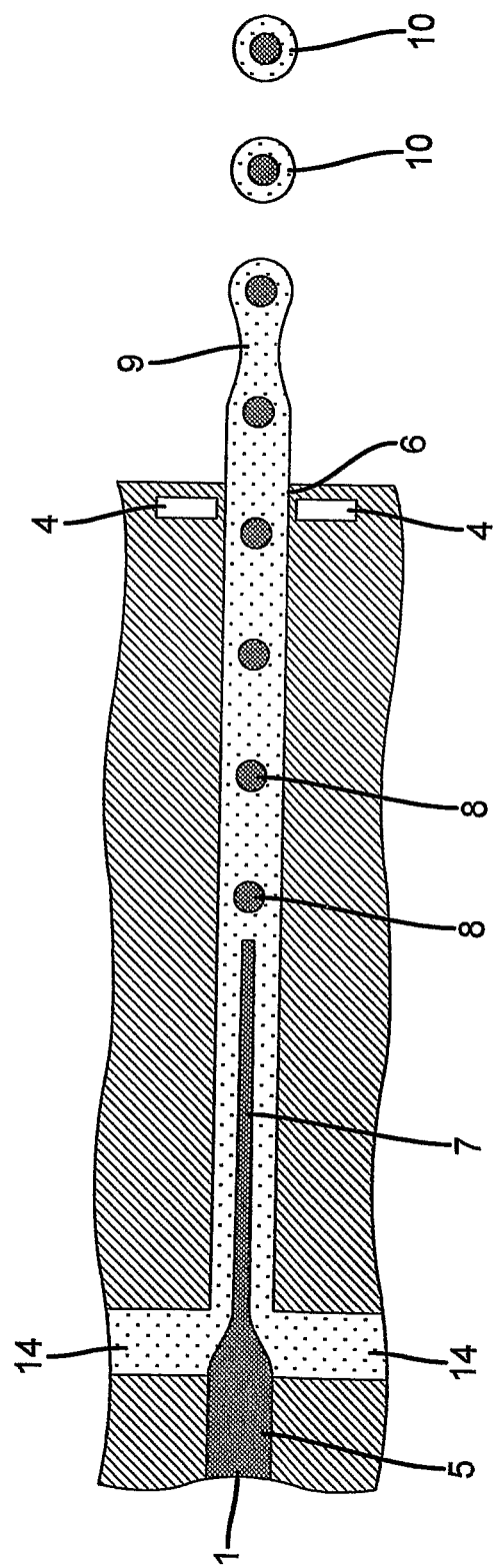

FIG. 2a illustrates the formation of immiscible droplets prior to an inkjet nozzle using a flow focussing device where the free jet is perturbed via a heater in the region of the nozzle. The first fluid 1 enters via channel or pipe 5 and the second fluid, immiscible with the first fluid, enters via channels, or pipes, 14. The flow rates are high enough that a jet, 7, of the first fluid is formed. This jet will spontaneously break into droplets 8. The droplets are carried with the flow out of a nozzle 6 to form a free jet 9, which breaks into droplets 10. In order that uniform drops are formed from the jet 9, an actuator 4 is provided. It will be appreciated that this might be a heater, or a piezo device or any such device that can perturb the jet and might surround or partially surround the jet or be formed of segments. The necessary criterion is that it perturbs the flow of the jet 9. Further the perturbation should have a particular phase relationship to the passage of the droplet of the first fluid through the nozzle.

It may also be advantageous to impart a perturbation to the internal jet 7. This is illustrated in FIGS. 2b and 2c. As illustrated in FIG. 2b heaters 11 impart a flow perturbation to the first fluid. The invention is not limited to the use of heaters. This could also be done by piezo devices or indeed any such device that can perturb the flow. Alternatively, as illustrated in FIG. 2c, heaters 11, or piezo devices or such like, can impart a flow perturbation to the second fluid which by virtue of being in contact will perturb the jet 7. It will be advantageous that a particular phase relationship is maintained between the perturbation applied to the jet 7 and that applied at the nozzle 6.

Additionally, as shown in FIG. 3, there are various ways of supplying a composite first fluid to channel 5. In FIG. 3a two fluids, 17 and 18 are brought together at junction 19 to form a composite fluid jet 12. Since the flow within the channels is laminar, the two fluids are separate and the resulting drops are Janus drops. A mixing device could be inserted such that the fluids are fully combined before the flow focussing junction 20. In FIG. 3b a drop within a drop within the freely jetted drop is formed. This is achieved by cascading two flow focusing devices 21 and 22. These and other well known microfluidic processes can be combined at will prior to the exit nozzle. Variations including devices to perturb the flows leading to the composite jet 7 are not illustrated. However it will be clear to those skilled in the art that devices combining features of FIG. 2 and FIG. 3 will be advantageous.

Whilst not shown in the Figures, it will also be clear to one skilled in the art that the angle that the channels 14 make to the axis of the device is not critical and can be chosen to optimise the particular device with the chosen fluids. Further, it will be appreciated that essentially the same device can be created by using either the cylindrical configuration of FIG. 1a, the planar configuration of FIG. 1b or the T configuration of FIG. 1c, or any other configuration of channels that create a liquid-in-liquid jet. Further it will also be appreciated that any reasonable cross section for the channels is acceptable e.g. square, circular, semi-circular, rectangular etc. For any such configuration the internal surfaces of the device should be lyophilic with respect to the second fluid and lyophobic with respect to the first fluid. Note in FIG. 3b this implies that the internal surface of device 22 has the opposite lyophilicity to that of device 21.

Figure 4:
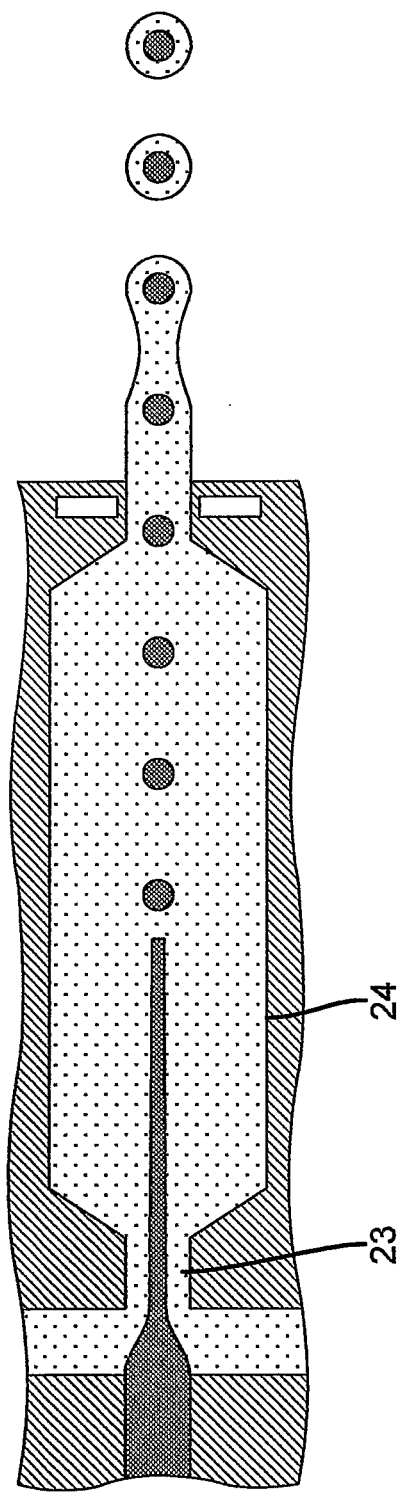
FIG. 4 schematically illustrates a continuous inkjet droplet generator with an expansion chamber.

In FIGS. 2 and 3, the length of the channel between the junction of the first fluid and the second fluid and the nozzle 6 should be large enough that the inner jet 7 has sufficient time to break up into droplets. Since the liquid velocity is high, this distance will be large with respect to the channel dimensions. This is in itself non-optimal for fabrication purposes, but also requires a large pressure differential along the channel. In order to avoid this FIG. 4 shows the device of FIG. 2 with an entrance region 23 and expanded region 24 to allow the jet 7 to slow and break into droplets. The factor of slowing will be proportional to the relative cross sections of the entrance region 23 and jet formation region 24. Again the dimensions are not critical other than they are sufficient to achieve the break-up into droplets of jet 7.

The flow velocity, surface tension and length of the cavity are mutually arranged such that the jet of the first fluid breaks within the cavity. For this purpose, it may be useful to consider the linear equations of a jet in air;

$$L_B = \frac{1}{U\alpha}\ln\left(\frac{R}{\xi_i}\right)$$

where $L_B$ is the breakoff length of the jet of the first fluid measured from the entrance to the cavity (m), U is the fluid velocity (m/s), R is the jet radius (m), $\alpha$ is the growth rate for a frequency of interest (1/s) (e.g. the Rayleigh frequency $f_R \sim U/(9.02R)$) and $\xi_i$ is the size of the initial perturbation (m). The growth rate may be obtained from the following equation $$\alpha^2 + \frac{3\eta(kR)^2}{\rho R^2}\alpha - \frac{\sigma}{2\rho R^3}(1-(kR)^2)(kR)^2 = 0$$

where $\eta$ is the viscosity of the first fluid (Pa·s), $\sigma$ is the interfacial tension (N/m) and k is the wavevector ($k=2\pi f/U$) (1/m). Thus the breakoff length $L_B$ may be estimated and compared with the cavity length, L.

Figure 5A:
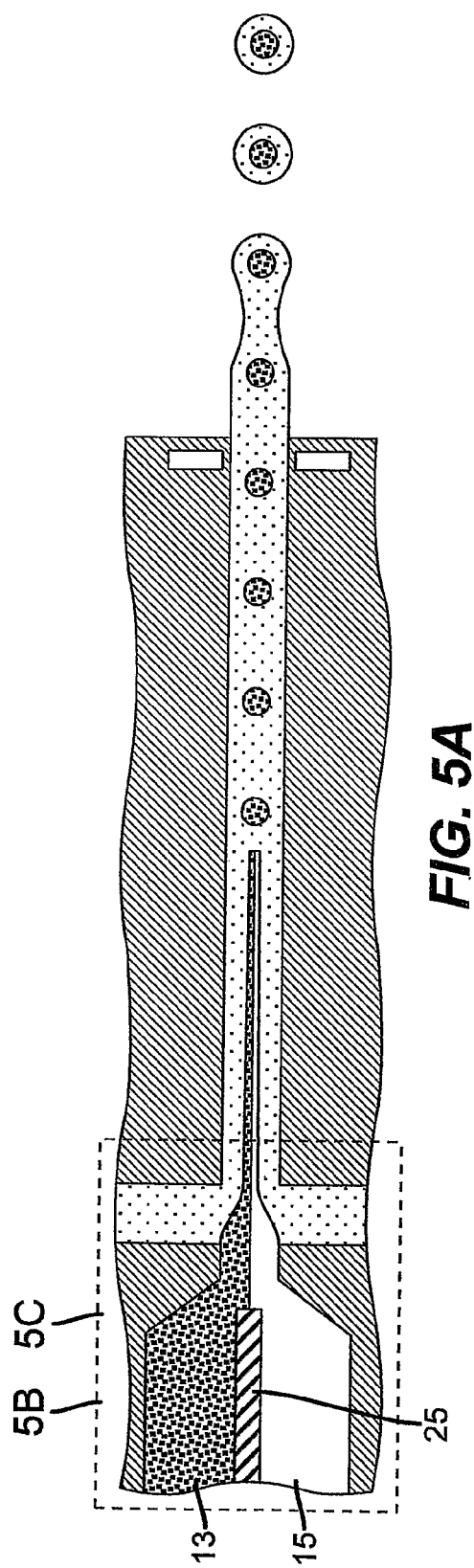
FIGS. 5a, 5b and 5c schematically illustrate a continuous inkjet droplet generator with continuous variation of the first fluid composition.
Figure 5C:
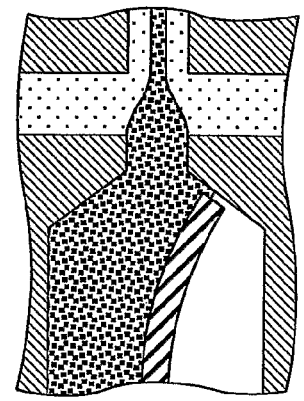
Figure 5B:
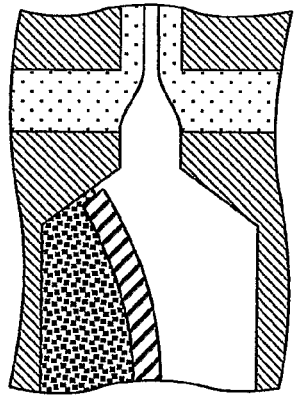
Figure 6:
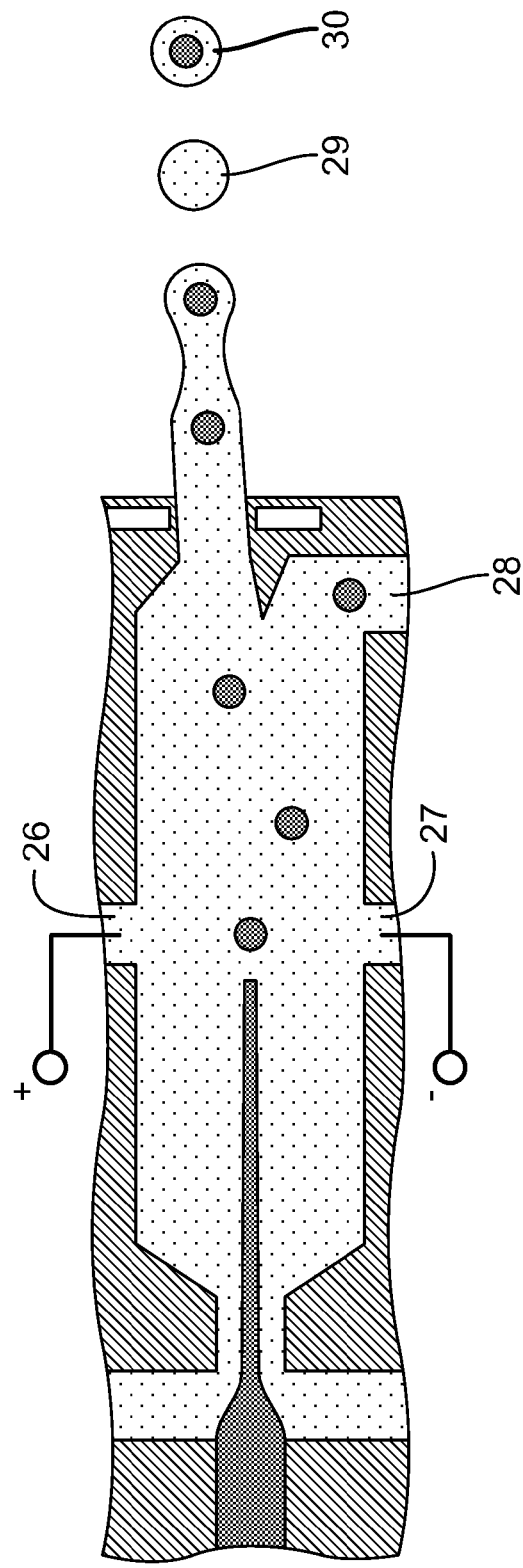
FIG. 6 schematically illustrates a continuous inkjet droplet generator with internal drop sorting.

For continuous inkjet printing, having generated a stream of droplets it is usual to separate those drops that will land on the substrate to be printed and those that do not. Those that do not land on the substrate are recirculated to the ink supply. This is a cumbersome process and within the invention detailed here can be alleviated to a great extent. FIGS. 5a, 5b, 5c, 6 and 7 illustrate examples by which the requirement for drop sorting is alleviated. FIG. 5 illustrates contone printing. FIG. 6 illustrates an internal drop sorting process. In FIG. 5 a deformable member 25 is provided such that when deformed to an upper position, liquid 13 is restricted, and when deformed to a lower position liquid 15 is restricted. A proportional position between the upper and lower positions provides a continuously variable proportion of liquids 13 and 15. Liquids 13 and 15 could for example be a liquid 13 containing colorant and a liquid 15 the same as liquid 13 but without the colorant. Any such combination of liquids is permissible.

In FIG. 6 an additional feature of droplet sorting is illustrated. In this instance channels 26 and 27 are provided within the jet forming region to allow electrodes to couple to the outer fluid and create an electro osmotic flow. Such a system is only applicable to a conductive outer second fluid. The cross flow generated will deflect the droplets of the first fluid so that they go to an internal channel 28 that could for example be taken to recirculate the fluid. Those droplets of the first fluid that are undeflected, or deflected upwards, go on to form jet droplets as before. Thus empty droplets 29 and filled droplets 30 of the second fluid are created which may be used for printing without the requirement of catching and recirculation as with a conventional continuous inkjet system. It will be understood that various mechanisms can be effected to deflect or gate the droplets. Although an electro osmotic method is described for the second fluid being conductive, were the second fluid non-conductive then a dielectrophoretic method would be appropriate.

Figure 7:
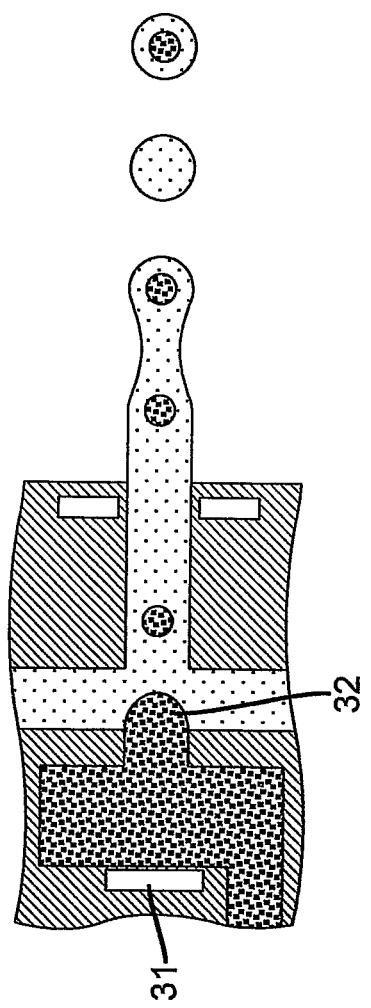
FIG. 7 schematically illustrates a continuous inkjet droplet generator with internal droplet generation on demand.

FIG. 7 illustrates the formation of droplets of the first fluid by a conventional thermal bubble jet process. A heater 31 provides a bubble to create a pressure perturbation that causes the meniscus 32 to break off a droplet of liquid. As with the device in FIG. 6 the result is droplets of the second fluid with and without the first fluid and therefore catching and recirculation are alleviated. A piezo device could also be used to create the droplet of the first fluid.

Two embodiments of a device shown to have performed the invention are described below with reference to FIGS. 8 and 9.

Figure 8:
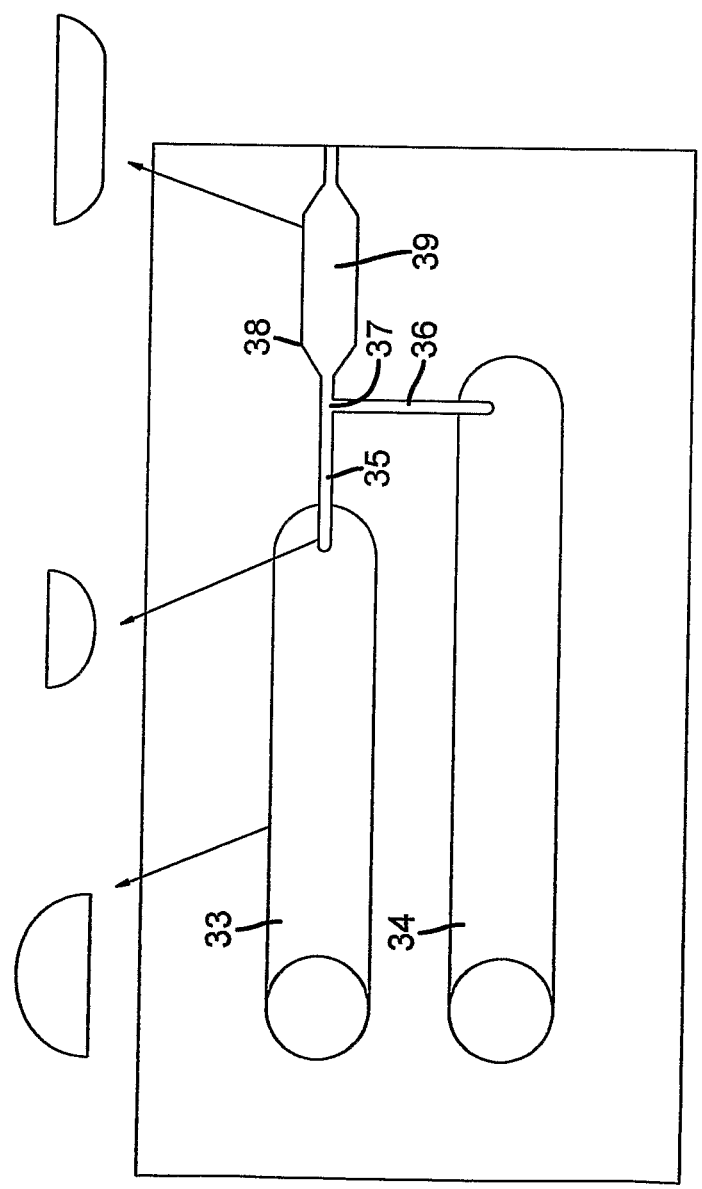
FIG. 8 illustrates a device suitable for performing the method of the invention.

FIG. 8 illustrates a first embodiment of a microfluidic device suitable for performing the method of the invention.

The device comprises a first arm 33 and a second arm 34. The two arms supply pipes 35 and 36 respectively. The pipes 35 and 36 meet at T junction 37. A nozzle 38 is located immediately downstream of the junction 37. A cavity 39 of larger cross sectional area than nozzle 38 is illustrated downstream of the nozzle 38. However this cavity is not an essential feature of the present invention A fluid, such as deionised water, is fed from arm 33 and through pipe 35. A fluid, such as oil (decane) containing a dye, is fed from arm 34 into pipe 36.

Over a range of relative pressures the oil formed droplets in the water stream as described above. The composite stream formed a jet that broke into droplets.

Figure 9:
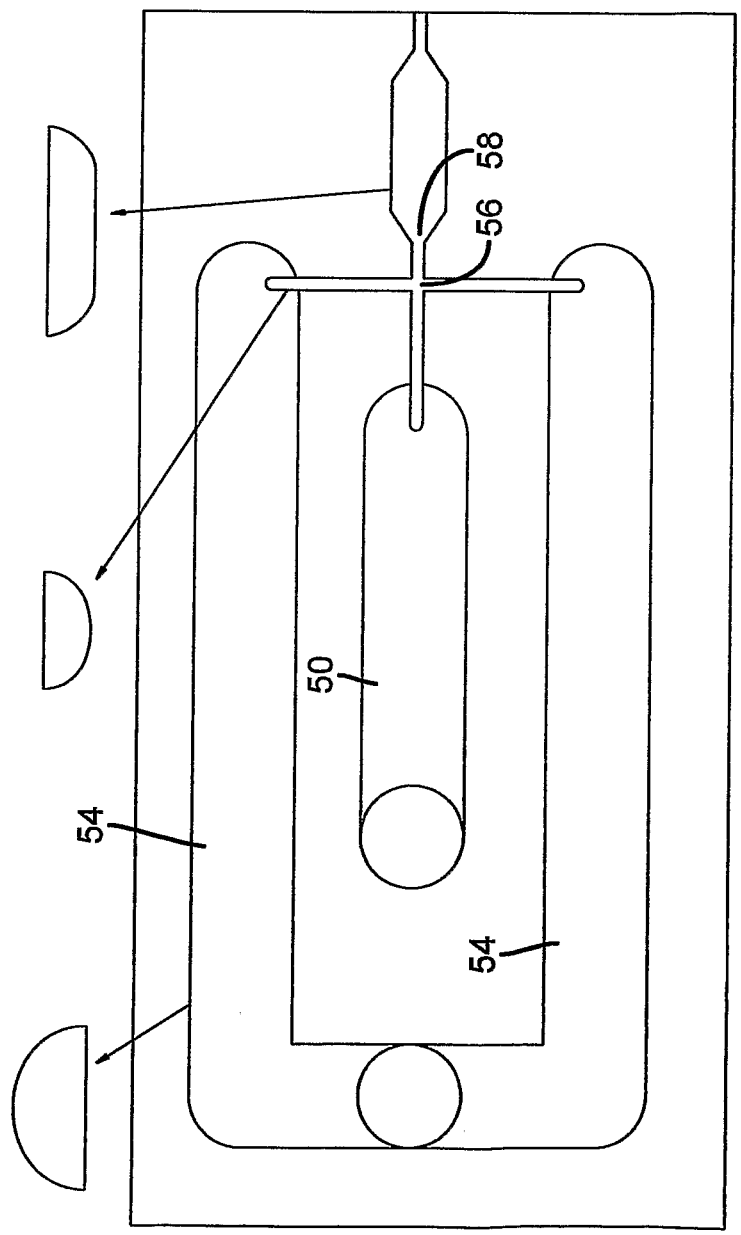
FIG. 9 illustrates another device suitable for performing the method of the invention.

FIG. 9 illustrates a further device suitable for performing the method of the invention.

The device shown in FIG. 9 has a central arm 50 and upper and lower arms 54. The upper and lower arms 54 meet the central arm 50 at a junction 56. A nozzle 58 is provided down stream of the junction 56.

Figure 10:
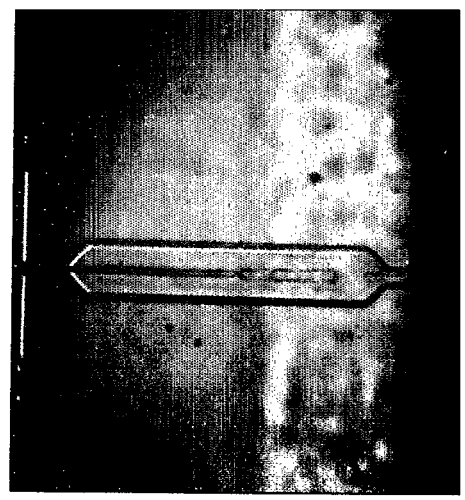
FIG. 10 is a copy of a photograph illustrating the break up of the jet into droplets.

A first fluid such as hexadecane is fed into the central arm 50. A second fluid, such as deionised water, was supplied from the upper and lower arms 54 at the same pressure. At the cross junction 56 a composite flow of oil drops in water was formed. FIG. 10 shows the break-up of the oil into droplets within the water phase.

Figure 11:
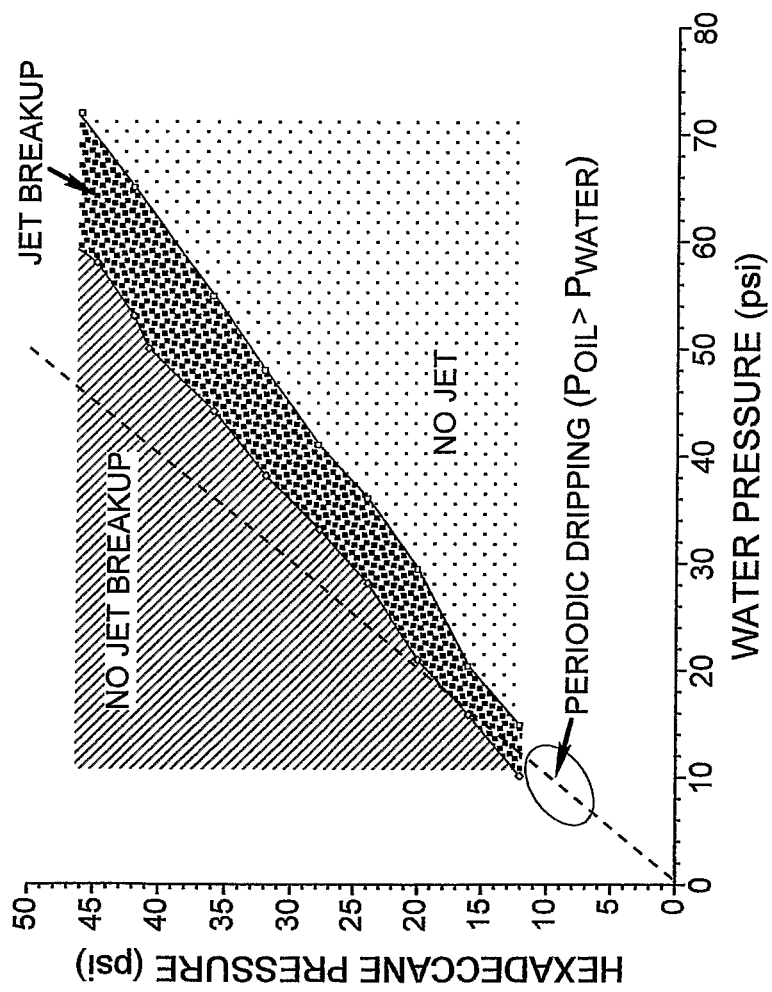
FIG. 11 is a graph of water pressure against oil pressure.

Depending on the pressure used to drive the liquids, or equivalently the liquid flow rates, either the oil jet completely traversed the cavity and exited the nozzle to form a coextruded jet, or the oil jet stopped completely and a meniscus poised or moved backwards, or if the water and oil pressures were within an appropriate range formed droplets within the cavity and subsequently formed drops within drops travelling at greater than 7 m/s. The graph of FIG. 11 summarises these experiments. The pressures were measured at the liquid supply and therefore may differ slightly for variations of filters, pipework etc. as one skilled in the art would expect. As the composite flow traversed the nozzle, or orifice, 58 the oil droplets initiated break up of the forming jet so that one oil drop was encapsulated in each water drop. The device of FIG. 9 has been shown to work for deionised water+Sodium Dodecyl Sulphate/Decane+Sudan Red; deionised water/Hexadecane; and deionised water/1-Octanol.

Figure 12:
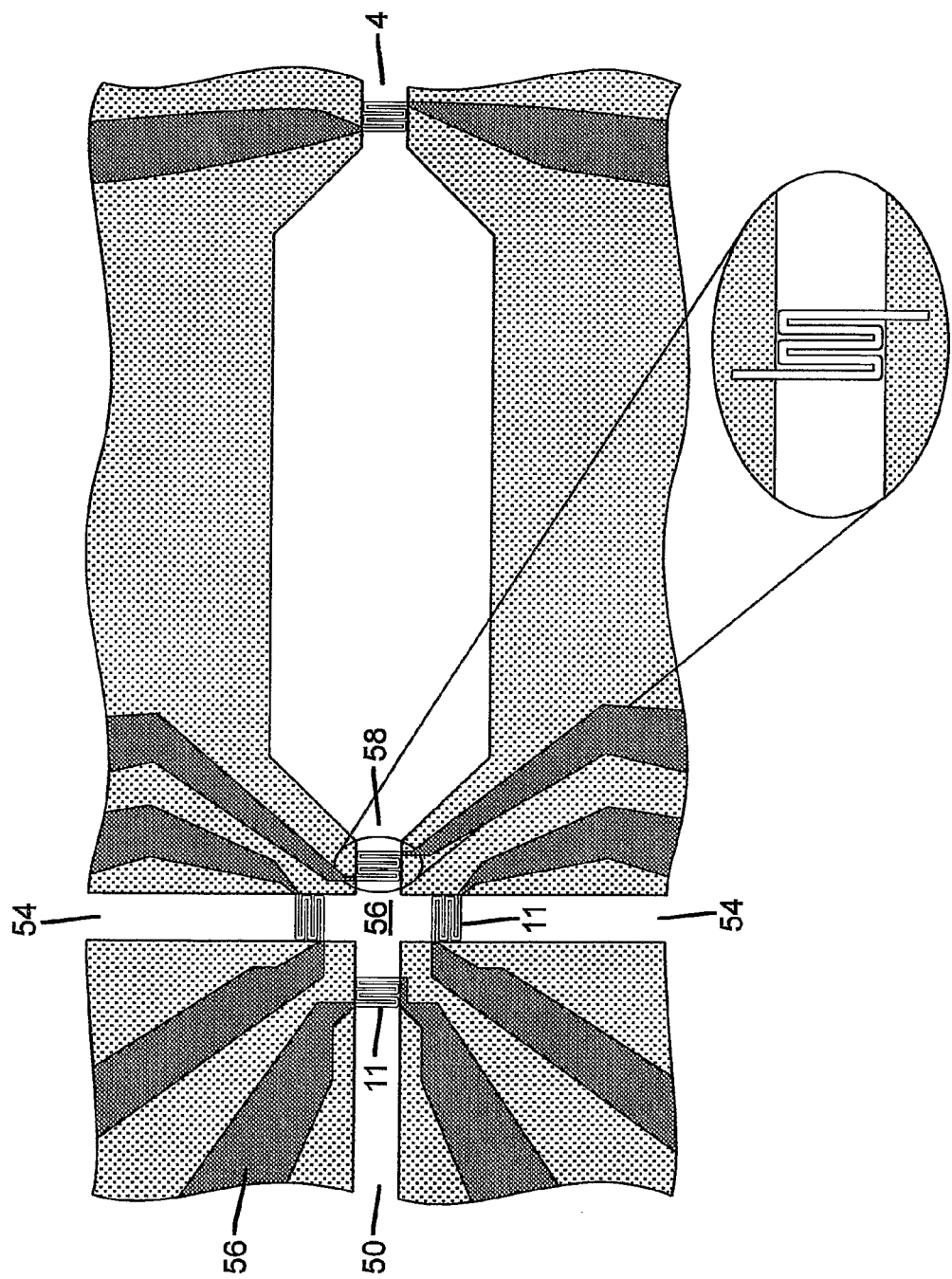
FIG. 12 illustrates a further device suitable for performing the method of the invention.

FIG. 12 shows a further embodiment of a microfluidic device suitable for performing the method of the invention. This device has the same essential features as already described for the device shown in FIG. 9. The device has a central arm 50 and upper and lower arms 54. The upper and lower arms 54 meet the central arm 50 at a junction 56. A nozzle 58 is provided downstream of the junction 56. A cavity lies downstream of the nozzle 58. In addition this embodiment has heater elements 11 located adjacent the arms 50, 54 and nozzle 58. Further heater elements 4 are located at the exit of the cavity. The heater elements may comprise 20 nm of platinum evaporated over 10 nm of titanium evaporated as a zig-zag pattern on one side of a glass channel. It was determined that heaters 11 could phase lock the jet 7 breakup in this device.

Figure 13B:
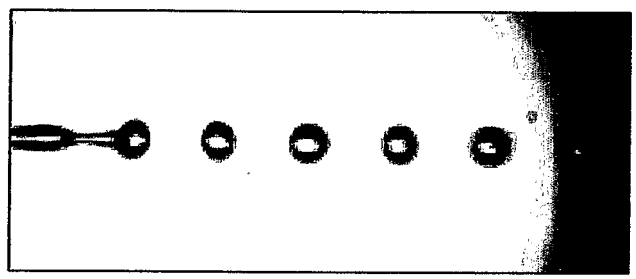
FIG. 13a is copy of a photograph showing breakup of a liquid in liquid jet and 13b is a copy of a photograph showing breakup of the composite jet external to the device.
Figure 13A:

FIG. 13a show an image of such droplet formation at 60 kHz in this channel wherein the maximum width was 100 μm and the length was 500 μm. The oil phase, jet 7, was Decane and the outer phase was deionised water. FIG. 13b shows the composite drop formation external to the device. It was further determined that heater 4 could perturb a jet of water and initiate breakup of such a jet.

The above description has been in relation to oil/solvent liquids being encapsulated in an aqueous carrier flow. The invention is equally applicable to aqueous droplets being formed within an oil based carrier flow. The two requirements are that the two liquids form an interface with an associated interfacial tension and the channel walls are lyophilic with respect to the second fluid. This implies that any two immiscible liquids would be appropriate. The liquid in liquid jet break-up will however be facilitated by higher interfacial tension. Thus two immiscible solvents would be appropriate, or a monomeric precursor for a polymer and immiscible solvent or materials that are liquids or liquid compositions rather than solvents, for example UV curable inks. Further, any additives that are compatible with either fluid are permissible. For example particulates in the form of pigments for graphics printing or colloidal metal particles for printing conductive tracks or colloidal ceramic particles or polymers suitable for an inkjet process. The invention is not limited to such fluids and particulates. The invention also includes a colorant, a dye, a monomer, a surfactant, a dispersant, inorganic particulates, organic particulates, or semiconductive polymers or semiconductive particulates, or conductive polymers, or conductive particulates, a molecule containing a cross-linking moiety, or a chemically reactive species. Others will occur to those skilled in the art.

The invention has been described in detail with reference to preferred embodiments thereof. It will be understood by those skilled in the art that variations and modifications can be effected within the scope of the invention.

The invention claimed is:

1. A microfluidic device for use in a continuous ink jet printer comprising at least one first channel for feeding a first fluid, at least one second channel for feeding a second fluid, and a nozzle, the channels intersecting such that shear forces allow a jet of the first fluid to form within the second fluid and to subsequently disintegrate to form spaced droplets of the first fluid contained within the second fluid prior to reaching the nozzle so that a composite jet of droplets of the first fluid and the second fluid is ejected through the nozzle, the microfluidic device further comprising means for perturbing the flow of the composite jet positioned proximate to the nozzle from which the composite jet flows, and means to individually perturb the path of each droplet of said first fluid within said second fluid.

2. A microfluidic device as claimed in claim 1 wherein the channel feeding the first fluid is provided with means to perturb the flow of the first fluid.

3. A microfluidic device as claimed in claim 1 wherein the channel feeding the second fluid is provided with means to perturb the flow of the second fluid.

4. A microfluidic device as claimed in claim 1 wherein some droplets of the first fluid are directed through the nozzle to form a composite jet and some droplets of the first fluid are directed through an alternative exit channel.

5. A microfluidic device as claimed in claim 1 including downstream of the composite jet flow a channel of broader cross section than the first or second channels which contracts to the nozzle.

6. A microfluidic device for use in a continuous ink jet printer comprising at least one first channel for feeding a first fluid and at least one second channel for feeding a second fluid, the channel feeding the first fluid being provided with means to initiate formation of a droplet of the first fluid within the second fluid, the composite of the first and second fluids passing through an orifice to form a jet, the composite jet being perturbed to initiate breakup such that the droplets of the first fluid are encapsulated within droplets of the second fluid, the microfluidic device further comprising means for perturbing the flow of the composite jet positioned proximate to the nozzle from which the composite jet flows, wherein the channel feeding the second fluid is provided with means to perturb the flow of the second fluid.

7. A microfluidic device as claimed in claim 6 including means to individually perturb the path of each droplet of said first fluid within said second fluid.

8. A microfluidic device for use in a continuous ink jet printer comprising at least one first channel for feeding a first fluid and at least one second channel for feeding a second fluid, the channels intersecting such that shear forces allow a jet of the first fluid to form within the second fluid and to subsequently disintegrate to form spaced droplets of the first fluid within the second fluid, and a subsequent nozzle to form a composite jet, wherein the channel feeding the second fluid is provided with means to perturb the flow of the second fluid.

9. A microfluidic device as claimed in claim 8 wherein the channel feeding the first fluid is provided with means to perturb the flow of the first fluid.

10. A microfluidic device for use in a continuous ink jet printer comprising at least one first channel for feeding a first fluid and at least one second channel for feeding a second fluid, the channels intersecting such that shear forces allow a jet of the first fluid to form within the second fluid and to subsequently disintegrate to form spaced droplets of the first fluid within the second fluid, a subsequent nozzle to form a composite jet, and means to individually perturb the path of each droplet of said first fluid within said second fluid.

11. A microfluidic device as claimed in claim 10 wherein some droplets of the first fluid are directed through the nozzle to form a composite jet and some droplets of the first fluid are directed through an alternative exit channel.

12. A microfluidic device as claimed in claim 10 wherein the channel feeding the first fluid is provided with means to perturb the flow of the first fluid.

13. A microfluidic device as claimed in claim 10 wherein the channel feeding the second fluid is provided with means to perturb the flow of the second fluid.

14. A microfluidic device for use in a continuous ink jet printer comprising at least one first channel for feeding a first fluid, at least one second channel for feeding a second fluid, and a nozzle, the channels intersecting such that shear forces allow a jet of the first fluid to form within the second fluid and to subsequently disintegrate to form spaced droplets of the first fluid contained within the second fluid prior to reaching the nozzle so that a composite jet of droplets of the first fluid and the second fluid is ejected through the nozzle, the microfluidic device further comprising means for perturbing the flow of the composite jet positioned proximate to the nozzle from which the composite jet flows, wherein the channel feeding the second fluid is provided with means to perturb the flow of the second fluid.

* * * * *